(12) United States Patent
Kim et al.

(10) Patent No.: US 12,216,747 B2
(45) Date of Patent: Feb. 4, 2025

(54) APPARATUS AND METHOD WITH IMAGE RECOGNITION-BASED SECURITY

(71) Applicant: SAMSUNG ELECTRONICS CO., LTD., Suwon-si (KR)

(72) Inventors: Joohyeon Kim, Seoul (KR); Donghoon Lee, Suwon-si (KR); Changyong Son, Anyang-si (KR); Do-Ha Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 17/675,015

(22) Filed: Feb. 18, 2022

(65) Prior Publication Data

US 2023/0049715 A1    Feb. 16, 2023

(30) Foreign Application Priority Data

Aug. 13, 2021  (KR) .................. 10-2021-0107439

(51) Int. Cl.
*G06F 21/32*  (2013.01)
*G06T 7/194*  (2017.01)
(Continued)

(52) U.S. Cl.
CPC .............. *G06F 21/32* (2013.01); *G06T 7/194* (2017.01); *G06T 7/20* (2013.01); *G06V 10/22* (2022.01);
(Continued)

(58) Field of Classification Search
CPC ......... G06F 21/32; G06F 21/50; G06T 7/194; G06T 7/20; G06T 2207/30201;
(Continued)

(56) References Cited

U.S. PATENT DOCUMENTS 8,370,639 B2 *  2/2013  Azar ...................... G06F 21/32
                                                         713/186
8,994,499 B2    3/2015  Zhao et al.
(Continued)

FOREIGN PATENT DOCUMENTS

JP              6442751 B2    12/2018
KR          10-1598771 B1     3/2016
(Continued)

*Primary Examiner* — Abiy Getachew
(74) *Attorney, Agent, or Firm* — NSIP Law

(57) ABSTRACT

An apparatus and a method with image recognition-based security are disclosed. The method includes, for an unlocked terminal, tracking a face detected in a previous frame, detecting a background region change between the previous frame and a current frame based on a region of the tracked face, when the background region change is not detected, determining whether a state maintenance time fails to meet a preset time, in response to the state maintenance time failing to meet the preset time, determining an operation mode to be a first operation mode for determining whether recognition succeeds for the current frame, performing the first operation mode, including performing face detection with respect to the current frame, and maintaining the unlocked state of the terminal for the current frame when the face is detected as a result of the performing of the face detection, representing that the recognition succeeded for the current frame.

22 Claims, 8 Drawing Sheets

(51) Int. Cl.
  *G06T 7/20* (2017.01)
  *G06V 10/22* (2022.01)
  *G06V 40/16* (2022.01)
(52) U.S. Cl.
  CPC .. *G06V 40/161* (2022.01); *G06T 2207/30201* (2013.01); *G06T 2207/30232* (2013.01)
(58) Field of Classification Search
  CPC .......... G06T 2207/30232; G06V 10/22; G06V 40/161; G06V 40/172; G06V 20/80; G06V 40/16; G06V 40/20
  See application file for complete search history.

(56) References Cited

U.S. PATENT DOCUMENTS

| | | | |
|---|---|---|---|
| 9,626,493 B2* | 4/2017 | Cohen | G06F 21/10 |
| 9,875,349 B2 | 1/2018 | Zhao et al. | |
| 2005/0094854 A1* | 5/2005 | Kim | G06V 40/167 |
| | | | 382/103 |
| 2013/0114865 A1* | 5/2013 | Azar | G07C 9/37 |
| | | | 726/19 |
| 2018/0285628 A1* | 10/2018 | Son | G06V 40/171 |

FOREIGN PATENT DOCUMENTS

| | | |
|---|---|---|
| KR | 10-1754014 B1 | 7/2017 |
| KR | 10-2018-0060223 A | 6/2018 |
| KR | 10-2021-0002852 A | 1/2021 |

\* cited by examiner

APPARATUS AND METHOD WITH IMAGE RECOGNITION-BASED SECURITY

CROSS-REFERENCE TO RELATED APPLICATIONS

This application claims the benefit under 35 USC § 119(a) of Korean Patent Application No. 10-2021-0107439 filed on Aug. 13, 2021, in the Korean Intellectual Property Office, the entire disclosure of which is incorporated herein by reference for all purposes.

BACKGROUND

1. Field

The following description relates to an apparatus and method with image recognition-based security.

2. Description of Related Art

Security of a system may be dependent on image-based user authentication.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a processor-implemented method includes determining between a locked state and an unlocked state of a terminal, and when a result of the determining between the locked state and the unlocked state of the terminal is that the terminal is in the unlocked state, tracking, in a current frame, a face detected in a previous frame, detecting for a background region change between the previous frame and the current frame based on a region of the tracked face, when a result of the detecting for the background region change is that the background region change is not detected, determining whether a state maintenance time of the unlocked state fails to meet an unlocked state maintenance preset time, where the state maintenance time of the unlocked state is a time for which the unlocked state of the terminal has been maintained for one or more previous frames, in response to the state maintenance time of the unlocked state failing to meet the unlocked state maintenance preset time, determining an operation mode to be a first operation mode for determining whether recognition succeeds for the current frame, performing the first operation mode, including performing face detection with respect to the current frame, and maintaining the unlocked state of the terminal for the current frame when the face is detected as a result of the performing of the face detection, representing that the recognition succeeded for the current frame.

The method may further include selectively permitting a user to access the terminal dependent on results of the performed first operation mode.

The method may further include, in response to the state maintenance time of the unlocked state meeting the unlocked state maintenance preset time, determining the operation mode to be a second operation mode for the determining of whether the recognition succeeds for the current frame, performing the second operation mode, including sequentially performing the face detection, facial recognition, and unauthorized object detection with respect to the current frame, and initializing the state maintenance time of the unlocked state.

The method may further include, when the result of the detecting for the background region change is that the background region change is detected, determining the operation mode to be a third operation mode for the determining of whether the recognition succeeds for the current frame, performing the third operation mode, including sequentially performing unauthorized object detection, the face detection, and face recognition with respect to the current frame, and initializing the state maintenance time of the unlocked state.

The method may further include, when the result of the determining between the locked state and the unlocked state is that is that the terminal is in the locked state, dependent on an unauthorized object having been detected in the previous frame, tracking, in the current frame, for the detected unauthorized object, determining whether a tracking reliability of a result of the tracking for the detected unauthorized object meets a threshold value, in response to the tracking reliability meeting the threshold value, determining whether a state maintenance time of the locked state fails to meet a locked state maintenance preset time, and in response to the state maintenance time of the locked state failing to meet the locked state maintenance preset time, determining the operation mode to be a fourth operation mode for the determining whether the recognition succeeds for the current frame, and maintaining, for the fourth operation mode, the locked state of the terminal with respect to the current frame.

The method may further include, in response to the tracking reliability failing to meet the threshold value, determining the operation mode to be a third operation mode for the determining of whether the recognition succeeds for the current frame, performing the third operation mode, including sequentially performing unauthorized object detection, the face detection, and face recognition with respect to the current frame, and initializing the state maintenance time of the locked state.

The method may further include, in response to the state maintenance time of the locked state meeting the locked state maintenance preset time, determining the operation mode to be a third operation mode for the determining of whether the recognition succeeds for the current frame, performing the third operation mode, including sequentially performing unauthorized object detection, the face detection, and face recognition with respect to the current frame, and initializing the state maintenance time of the locked state.

The method may further include, when the result of the determining between the locked state and the unlocked state is that is that the terminal is in the locked state, dependent on a foreground object having not been detected in the previous frame, performing the detecting for the background region change between the previous frame and the current frame, when a result of the performing of the detecting for the background region change is that the background region change is not detected, determining whether a state maintenance time of the locked state fails to meet a locked state maintenance preset time, and in response to the state maintenance time of the locked state failing to meet the locked state maintenance preset time, determining the operation mode to be a fourth operation mode for the determining whether the recognition succeeds for the current frame, and maintaining, for the fourth operation model, the locked state of the terminal with respect to the current frame.

The method may further include, when the result of the performing of the detecting for the background region change is that the background region change is detected, determining the operation mode to be a second operation mode for the determining of whether the recognition succeeds for the current frame, performing the second operation mode, including sequentially performing the face detection, face recognition, and unauthorized object detection with respect to the current frame, and initializing the state maintenance time.

The method may further include, when the result of the performing of the detecting for the background region change is that the background region change is not detected, and the state maintenance time of the locked state meets the locked state maintenance preset time, determining the operation mode to be a second operation mode for the determining of whether the recognition succeeds for the current frame, and performing the second operation mode, including sequentially performing the face detection, face recognition, and unauthorized object detection with respect to the current frame.

The method may further include, when the result of the determining between the locked state and the unlocked state is that the terminal is in the locked state, dependent on a face recognition for the previous frame having failed or a plurality of faces having been detected in the previous frame, determining the operation mode to be a second operation mode for the determining of whether the recognition succeeds for the current frame, and performing the second operation mode, including sequentially performing the face detection, face recognition, and unauthorized object detection with respect to the current frame.

The method may further include selectively permitting a user to access the terminal dependent on results of the performed second operation mode.

The detecting for the background region change may include determining a threshold value for the background region change based on the region of the tracked face, calculating a difference between a size of a background region in the previous frame and a size of a background region in the current frame, and detecting the background region change in response to the calculated difference meeting the threshold value.

In one general aspect, an apparatus includes one or more processors configured to determine between a locked state and an unlocked state of a terminal, and, when a result of the determination between the locked state and the unlocked state of the terminal is that the terminal is in the unlocked state, track, in a current frame, a face detected in a previous frame, detect for a background region change between the previous frame and the current frame based on a region of the tracked face, when a result of the detection for the background region change is that the background region change is not detected, determine whether a state maintenance time of the unlocked state fails to meet an unlocked state maintenance preset time, where the state maintenance time of the unlocked state is a time for which the unlocked state of the terminal has been maintained for one or more previous frames, and in response to the state maintenance time of the unlocked state failing to meet the unlocked state maintenance preset time, determine an operation mode to be a first operation mode for determining whether recognition succeeds for the current frame, perform the first operation mode, including performance of face detection with respect to the current frame, and maintain the unlocked state of the terminal for the current frame when the face is detected as a result of the performance of the face detection, representing that the recognition succeeded for the current frame.

The processor may be further configured to selectively permit a user to access the terminal dependent on results of the performed first operation mode.

The processor may be configured to, in response to the state maintenance time of the unlocked state meeting the unlocked state maintenance preset time, determine the operation mode to be a second operation mode for the determining of whether the recognition succeeds for the current frame, perform the second operation mode, including a sequential performance of the face detection, facial recognition, and unauthorized object detection with respect to the current frame, and initialize the state maintenance time of the unlocked state.

The processor may be configured to, when the result of the detection for the background region change is that the background region change is detected, determine the operation mode to be a third operation mode for the determining of whether the recognition succeeds for the current frame, perform the third operation mode, including a sequential performance of unauthorized object detection, the face detection, and face recognition with respect to the current frame, and initialize the state maintenance time of the unlocked state.

The processor may be configured to, when the result of the determination between the locked state and the unlocked state is that is that the terminal is in the locked state, dependent on an unauthorized object having been detected in the previous frame, track, in the current frame, for the detected unauthorized object, determine whether a tracking reliability of a result of the tracking for the detected unauthorized object meets a threshold value, in response to the tracking reliability meeting the threshold value, determine whether a state maintenance time of the locked state fails to meet a locked state maintenance preset time, and, in response to the state maintenance time of the locked state failing to meet the locked state maintenance preset time, determine the operation mode to be a fourth operation mode for the determining whether the recognition succeeds for the current frame, and maintain, for the fourth operation mode, the locked state of the terminal with respect to the current frame.

The processor may be configured to, in response to the tracking reliability failing to meet the threshold value, determine the operation mode to be a third operation mode for the determining of whether the recognition succeeds for the current frame, perform the third operation mode, including a sequential performance of unauthorized object detection, the face detection, and face recognition with respect to the current frame, and initialize the state maintenance time of the locked state.

The processor may be configured to, in response to the state maintenance time of the locked state meeting the locked state maintenance preset time, determine the operation mode to be a third operation mode for the determining of whether the recognition succeeds for the current frame, perform the third operation mode, including a sequential performance of unauthorized object detection, the face detection, and face recognition with respect to the current frame, and initialize the state maintenance time of the locked state.

The processor may be configured to, when the result of the determination between the locked state and the unlocked state is that is that the terminal is in the locked state, dependent on a foreground object having not been detected in the previous frame, perform the detection for the background region change between the previous frame and the current frame, when a result of the performance of the detection for the background region change is that the background region change is not detected, determine whether a state maintenance time of the locked state fails to meet a locked state maintenance preset time, and in response to the state maintenance time of the locked state failing to meet the locked state maintenance preset time, determine the operation mode to be a fourth operation mode for the determining whether the recognition succeeds for the current frame, and maintain, for the fourth operation model, the locked state of the terminal with respect to the current frame.

The processor may be configured to, when the result of the performance of the detection for the background region change is that the background region change is detected, determine the operation mode to be a second operation mode for the determining of whether the recognition succeeds for the current frame, perform the second operation mode, including a sequential performance of the face detection, face recognition, and unauthorized object detection with respect to the current frame, and initialize the state maintenance time.

The processor may be configured to, when the result of the performance of the detection for the background region change is that the background region change is not detected, and the state maintenance time of the locked state meets the locked state maintenance preset time, determine the operation mode to be a second operation mode for the determining of whether the recognition succeeds for the current frame, and perform the second operation mode, including a sequential performance of the face detection, face recognition, and unauthorized object detection with respect to the current frame.

The processor may be configured to, when the result of the determination between the locked state and the unlocked state is that the terminal is in the locked state, dependent on a face recognition for the previous frame having failed or a plurality of faces having been detected in the previous frame, determine the operation mode to be a second operation mode for the determining of whether the recognition succeeds for the current frame, perform the second operation mode, including a sequential performance of the face detection, face recognition, and unauthorized object detection with respect to the current frame, and selectively permit a user to access the terminal dependent on results of the performed second operation mode.

The apparatus may further include one or memories storing instructions, which when executed by the one or more processors, configure the one or more processors to perform any one or any combination of the determination between the locked state and the unlocked state of the terminal, the tracking, the detection of the background region change, the determination of whether the state maintenance time of the unlocked state fails to meet the unlocked state maintenance preset time, the determination of the operation mode to be the first operation mode, and the performance of the first operation.

In one general aspect, an apparatus includes one or more processors configured to perform a first operation mode which includes a face detection with respect to a current frame, perform another operation mode which includes the face detection and at least one of facial recognition and unauthorized object detection with respect to the current frame, where the first operation mode is performed without performing the facial recognition and without performing the unauthorized object detection, determine between a locked state and an unlocked state of a terminal for the current frame, when a result of the determination between the locked state and the unlocked state of the terminal is that the terminal is in the unlocked state, perform one operation mode selected between the first operation mode and the other operation mode for determining whether recognition of a user succeeds for the current frame, and, when a result of the determination between the locked state and the unlocked state of the terminal is that the terminal is in the locked state dependent on a previous frame, determine one or more reasons why the terminal is in the locked state dependent on the previous frame and selectively maintain the terminal in the locked state dependent on the determined one or more reasons, for the determining of whether the recognition succeeds for the current frame.

The performance of the one operation mode selected between the first operation mode and the other operation mode may include selecting between the first operation mode and the other operation dependent on whether a state maintenance time of the unlocked state meets an unlocked state maintenance preset time, where the state maintenance time of the unlocked state may be a time for which the unlocked state of the terminal has been maintained for one or more previous frames.

The performance of the one operation mode selected between the first operation mode and the other operation mode may include selecting between the first operation mode and the other operation dependent on whether a background region change, between the previous frame and the current frame based on a region of a face, detected in a previous frame, tracked in the current frame, is detected.

The other operation mode may include a second operation mode which includes a sequential performance of face detection, the facial recognition, and the unauthorized object detection with respect to the current frame, and a third operation mode which includes a sequential performance of the unauthorized object detection, the face detection, and the face recognition with respect to the current frame, wherein, when the result of the determination between the locked state and the unlocked state of the terminal is that the terminal is in the unlocked state, the performing of the one operation mode selected between the first operation mode and the other operation mode may include performing an operation mode selected between the first operation mode, the second operation mode, and the third operation for the determining of whether the recognition of the user succeeds for the current frame.

The performance of the operation mode selected between the first operation mode, the second operation mode, and the third operation mode may include performance of the operation mode selected between the first operation mode and the second operation mode dependent on whether a state maintenance time of the unlocked state meets an unlocked state maintenance preset time, where the state maintenance time of the unlocked state may be a time for which the unlocked state of the terminal has been maintained for one or more previous frames.

The performance of the operation mode selected between the first operation mode, the second operation mode, and the third operation mode may include performance of the operation mode selected between the first operation mode and the third operation mode dependent on whether a background region change, between the previous frame and the current frame based on a region of a face, detected in a previous frame, tracked in the current frame, is detected.

The selective maintenance of the terminal in the locked state dependent on the determined one or more reasons may include selecting, when a reason of the determined one or more reasons why the terminal is in the locked state is that an unauthorized object was detected in the previous frame, between maintaining the terminal in the locked state and performing the other operation mode, for the determining of whether the recognition succeeds for the current frame, based on whether the unauthorized object detected in the previous frame is detected in the current frame.

The other operation mode may include a sequential performance of the unauthorized object detection, the face detection, and the face recognition with respect to the current frame.

The selective maintenance of the terminal in the locked state dependent on the determined one or more reasons may include selecting, when the reason of the determined one or more reasons why the terminal is in the locked state is that a foreground object was not detected in the previous frame, between maintaining the terminal in the locked state and performing the other operation mode, for the determining of whether the recognition succeeds for the current frame, based on whether a background region change, between the previous frame and the current frame based on a region of a face, detected in a previous frame, tracked in the current frame, is detected.

The other operation mode may include a sequential performance of face detection, the facial recognition, and the unauthorized object detection with respect to the current frame.

The selective maintenance of the terminal in the locked state dependent on the determined one or more reasons may include selecting, when the reason of the determined one or more reasons why the terminal is in the locked state is that a face recognition for the previous frame had failed or that a plurality of faces had been detected in the previous frame, to perform the other operation mode for the determining of whether the recognition succeeds for the current frame.

The other operation mode may include a sequential performance of face detection, the facial recognition, and the unauthorized object detection with respect to the current frame.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
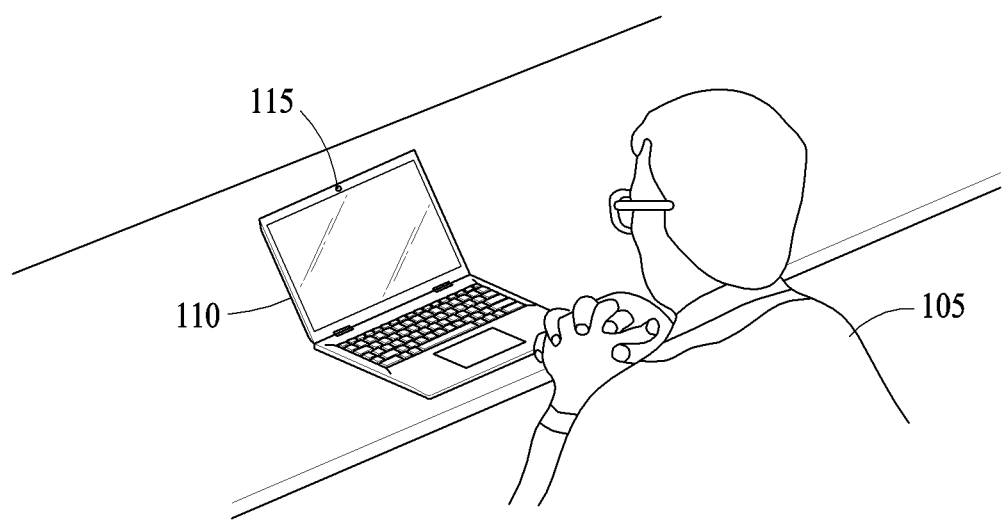
FIG. 1 illustrates an example apparatus with image recognition-based security, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

FIG. 1 illustrates an example apparatus with image recognition-based security, according to one or more embodiments.

Referring to FIG. 1, illustrated is an environment in which a user 105 uses a terminal 110 including a camera 115. The terminal 110 is further representative of one or more processors and one or more memories. The environment illustrated in FIG. 1 may be, for example, an environment in which the user 105 works from home, learns online, has an online meeting, or takes an online test, through the terminal 110, as non-limiting examples.

For example, and as non-limiting examples, in the environment illustrated in FIG. 1, a user (e.g., the user 105) may have limited permission to access the example terminal 110 dependent on image-based recognition, and/or the user may access to the example terminal 110 based on a selective unlocking of the example terminal 110 to permit the user access to the example terminal 110 dependent on such image-based recognition.

The terminal 110 may be one of various types of electronic apparatuses, for example, a smartphone, a portable terminal, a mobile terminal, a foldable terminal, a personal computer (PC), a laptop computer, a tablet PC, a wearable device (e.g., a watch-type terminal (e.g., a smartwatch), a glass-type terminal (e.g., a smart glass), a head-mounted display (HMD), etc.), and a smart television (TV), noting that additional or alternate examples are also available. Thus, as an apparatus herein, the terminal 110 may be described below as an apparatus with recognition-based security, e.g., an example image-recognition based security, which may control selective access to operations, functions, and systems or files/applications/access of the terminal 110, and thus, control various operations and functions of the terminal 110 based on such recognition-based security, as a non-limiting example. Any one, combination, or all operations and methods described herein, e.g., including security methods or operations and/or apparatus control based on such security methods and operations, may be implemented by terminal 110, as a non-limiting example, as well as remaining apparatuses or devices otherwise described herein. The apparatus of FIG. 2 and/or apparatus 700 of FIG. 7 may also correspond to the terminal 110, or the apparatus of FIG. 2 and/or apparatus 700 of FIG. 7 may be example components of the terminal 110 or any other electronic apparatus embodiment, where any of such apparatuses may include one or more processors, memories, and/or cameras as well as other components, as non-limiting examples, and where the any one, combination, or all operations and methods described herein, e.g., including any one, combination, or all security methods or operations and/or apparatus control examples based on such security methods and operations, may be implemented through hardware and/or combinations of hardware and instructions stored in such one or more memories, which when executed by at least one processor of the one or more processors configure the at least one processor or the one or more processors to implement such any one, combination, or all operations and methods described herein, e.g., including any one, combination, or all security methods or operations and/or apparatus control based on such security methods and operations. For simplicity of explanation of such various example embodiments such an electronic apparatus or other apparatus that may have recognition security will hereinafter simply be referred to as an "apparatus," e.g., an apparatus with recognition-based security.

In an example, the apparatus may periodically receive or obtain an image from/using the camera 115 of the terminal 110, and control access of the user 105 to the terminal 110 by detecting a face of the user 105 in the received image, by performing face authentication (or face recognition herein), or by detecting an unauthorized object such as a mobile phone and a camera, as non-limiting examples. Herein, for user authentication, while discussions are presented with example image-based recognitions, example embodiments include various biometric authentication hardware and methods. For example, the apparatus may perform iris detection and iris authentication (or iris recognition), e.g., in addition to or instead of face detection and face recognition. Still further, the term "face recognition" used herein may be construed as being the same as "face authentication" in this disclosure.

In an example, the apparatus may set the terminal 110 to be one of a locked state and an unlocked state based on results of face detection, face recognition, and unauthorized object detection. For example, when the apparatus is the terminal 110 the terminal 110 may set itself to be one of the locked state and the unlocked state, or when the apparatus is a component (or separate from) the terminal 110 the apparatus may control the setting of the example terminal 110 to be one of the locked state and the unlocked.

For example, the apparatus may detect a face in an image input for user authentication. When user authentication is successful with the face detected in the image, the apparatus may set the terminal 110 to be the unlocked state.

When the user 105 captures an image of a screen of the terminal 110 using the camera 115 or a mobile phone, there may be a risk that internal data is leaked, e.g., through sharing of the captured image, and thus the apparatus may detect an unauthorized object such as the camera 115 in the image. When an unauthorized object is detected for in the image, no face is detected in the image, face recognition fails, or a plurality of faces are detected in the image, the apparatus may set the terminal 110 to be the locked state.

The apparatus could perform object detection, such as face detection and unauthorized object detection, and user authentication on all acquired images that are input, for the purpose of security. However, in such a case, great computing resources may be continuously consumed.

In such an environment as a working from home (or telecommuting) environment, an online meeting environment, an online learning environment, and an online test environment, there may be a relatively higher risk of leakage of information, learning contents, and test contents of a company or institution where the user 105 works or belongs to, compared to an offline environment. Thus, in the environment illustrated in FIG. 1, the environment may generally an environment where the user 105 alone uses the terminal 110 in an independent space for security, for example, or otherwise a space or environment where a high security level may be predetermined for/by the apparatus.

When an environment in which secure authentication is desired to be performed is limited to some extent as the environment illustrated in FIG. 1, by performing only select operations or an operation suitable for a current situation based on a current input frame and an operation history associated with a previous input frame, the apparatus may use computing resources more effectively.

The apparatus and a method of controlling the apparatus may be used in an environment in which image-based authentication is desired or predetermined to be periodically performed in one place, for example, such as illustrated in FIG. 1.

Figure 2:
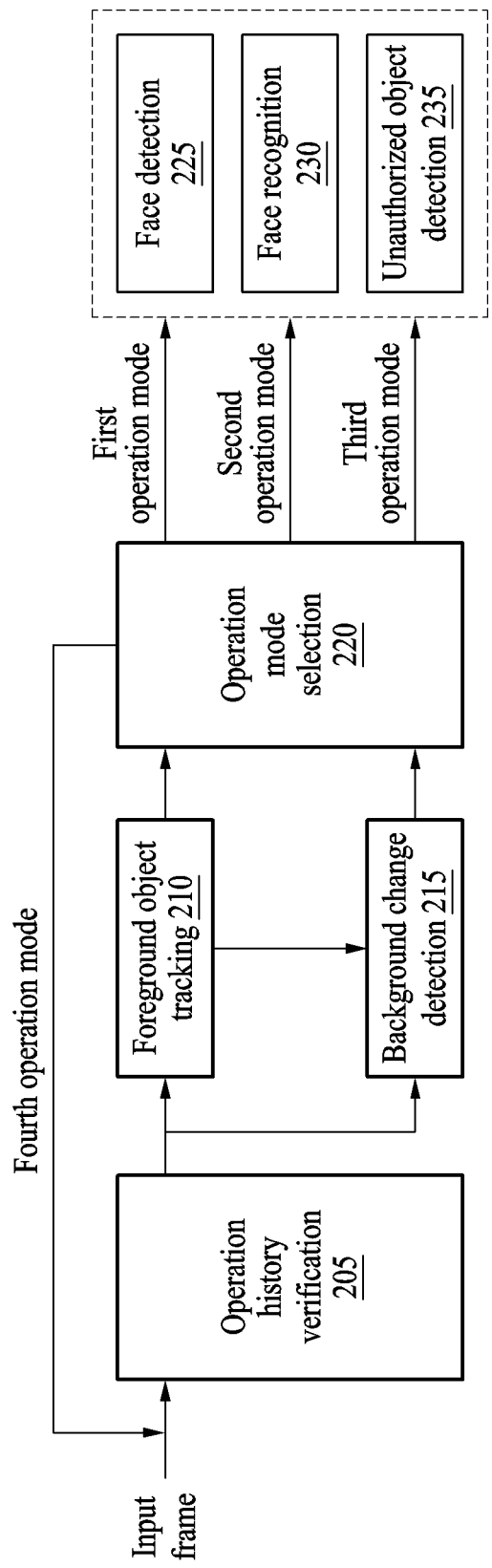
FIG. 2 illustrates an example apparatus with image recognition-based security, according to one or more embodiments.

FIG. 2 illustrates an example apparatus with image recognition-based security, according to one or more embodiments.

In a system or apparatus where security may be desired, image acquisition, object detection, and user authentication may be performed. However, when object detection and user authentication are performed and processed identically on all images input in corresponding periods for such security purposes, the repetition of all of these operations for all such acquired images may be inefficient.

An apparatus (e.g., the terminal 110 or an apparatus 700 of FIG. 7, as non-limiting examples) and a method of controlling the apparatus of an example embodiment may determine an operation to be performed by the apparatus on a current input frame (or captured frame herein) based on an operation history associated with a previous input frame (or captured frame herein). Hereinafter, examples may be provided under an example assumption that a user (e.g., the user 105 of FIG. 1) works from home using a terminal (e.g., the terminal 110 of FIG. 1), but this assumption is a non-limiting example and presented merely for increased clarity and conciseness of description. The following description may also correspond to environments including, for example, a working from home (or telecommuting) environment, an online meeting environment, an online learning environment, and an online test environment, in various embodiments.

In an example, the apparatus may receive an input frame from the terminal. For example, the apparatus may receive or obtain a current input frame from a camera of the terminal.

In operation 205, when the apparatus receives the current input frame, the apparatus may verify an operation history of the apparatus in association with at least one previous input frame. The apparatus may identify, as the operation history, a current state as to whether the terminal is locked and a reason for the current state, based on a result of processing the previous input frame.

For example, when the user is normally working, the user may work using the terminal that is unlocked as or when face recognition performed on the previous input frame is successful. The apparatus may verify that the terminal is currently in an unlocked state because a face is detected in the previous input frame and recognition on the detected face is successful.

For another example, when the user is normally having an online meeting, learning online, or taking an online test, the user may have the meeting, learn online, or take the online test using the terminal that is unlocked as or when face recognition performed on the previous input frame is successful. The apparatus may verify that the terminal is currently in the unlocked state because a face is detected in the previous input frame and recognition on the detected face is successful.

In another example, when an unauthorized object is detected in the previous input frame, the terminal may be set to be a locked state for security. The unauthorized object may include, for example, a camera, an electronic device including a camera, and a person (e.g., a body). In this example, the apparatus may verify that the terminal is currently in the locked state because the unauthorized object is detected in the previous input frame.

In another example, when a plurality of faces are detected in the previous input frame, the terminal may be set to be the locked state for security because it may be common for a user to be alone when he or she works from home. In this example, the apparatus may verify that the terminal is currently in the locked state because a plurality of faces are detected in the previous input frame.

Also, when a plurality of faces are detected in the previous input frame, the terminal may be set to be the locked state for security because it may be common for a user to be alone when he or she has an online meeting, learns online, or takes an online test. In this example, the apparatus may verify that the terminal is currently in the locked state because a plurality of faces are detected in the previous input frame.

In another example, when a foreground object such as a face, an unauthorized object, or a person is not detected in the previous input frame, the terminal may be set to be the locked state for security. In this example, the apparatus may verify that the terminal is currently in the locked state because the foreground object is not detected in the previous input frame.

The apparatus may determine an operation mode to effectively use computing resources, e.g., by performing only predetermined operations according to respectively determined situations, or by effectively not using computing resources by not performing all or select operations according to respective determined situations. The apparatus may or may not perform at least one of face detection 225, face recognition 230 on a detected face, and unauthorized object detection 235 according to each operation mode. The apparatus may be controlled according to a determined operation mode.

To determine an operation mode suitable for a situation, the apparatus may or may not perform at least one of operation 210 of tracking, in the current input frame, a foreground object detected in the previous input frame and operation 215 of detecting a background region change between the previous input frame and the current input frame, based on the operation history verified in the operation 205.

For example, when the apparatus verifies in operation 205 that the terminal is currently in the unlocked state as or when face recognition succeeds, the apparatus may track the face detected in the previous input frame in operation 210, and detect a change between a background region in the previous input frame and a background region in the current input frame based on a background region excluding a region of the face tracked in the current input frame in operation 215.

When the apparatus verifies in operation 205 that the terminal is in the locked state because a foreground object is not detected in the previous input frame, the apparatus may not perform operation 210 because there is no foreground object to be tracked in the current input frame, but detect the change in the background region between the previous input frame and the current input frame in operation 215.

The apparatus may determine an operation mode based on the operation history verified in operation 205 and results of operations 210 and 215. The apparatus may or may not perform at least one of face detection 225, face recognition 230 on a detected face, and unauthorized object detection 235 according to each operation mode.

In a case in which a change between the previous input frame and the current input frame is not great, there may be a high probability that a situation in the previous input frame (e.g., a situation in which the user is working, having a meeting, learning, or taking a test using the terminal) is maintained still in the current input frame. When the situation in the previous input frame is highly likely to be maintained even in the current input frame, the apparatus may efficiently use computing resources by performing only a minimum predetermined operations desired or necessary for security.

For example, in a telecommuting environment, when the terminal is currently unlocked as or when face recognition is successful with the previous input frame and the background region change is not detected in the current input frame, there may be a high probability that a normal working environment in the previous input frame continues even in the current input frame. Thus, there may be no security issues even when face recognition is not performed on the current input frame.

For example, in an example online meeting environment, an online learning environment, or an online test environment, when the terminal is currently unlocked as or when face recognition is successful with the previous input frame and the background region change is not detected in the current input frame, there may be a high probability that a normal meeting, online learning, or online test environment in the previous input frame continues even in the current input frame. Thus, there may be no security issue even when face recognition is not performed on the current input frame.

When the terminal is currently unlocked as or when face recognition is successful with the previous input frame and the background region change is not detected in the current input frame, performing face recognition again on the current input frame may be inefficient because the apparatus may waste computing resources with the additionally performed face recognition. For example, the apparatus may perform only face detection on the current input frame and, when a face is detected, maintain the unlocked state of the terminal without performing face recognition, and thereby may efficiently use computing resources.

However, even when such an environment of the previous input frame as a working environment, a meeting environment, a learning environment, or a test environment continues throughout a plurality of frames, face detection 225, face recognition 230 on a detected face, and unauthorized object detection 235 may desirably be performed at regular intervals for the purpose of security maintenance. When a state maintenance time, which is a time for which a state in which the terminal is locked or unlocked is maintained based on the operation history verified in operation 205, meets a preset time, e.g., is greater than the preset time, the apparatus may determine an operation mode such that face detection 225, face recognition 230 on a detected face, and unauthorized object detection 235 are performed.

Non-limiting examples of operations 205, 210, 215, and 220 and the operation mode of the apparatus will be respectively described later in greater detail with reference to FIGS. 5A through 5C, and 6A and 6B, for example.

Figure 3:
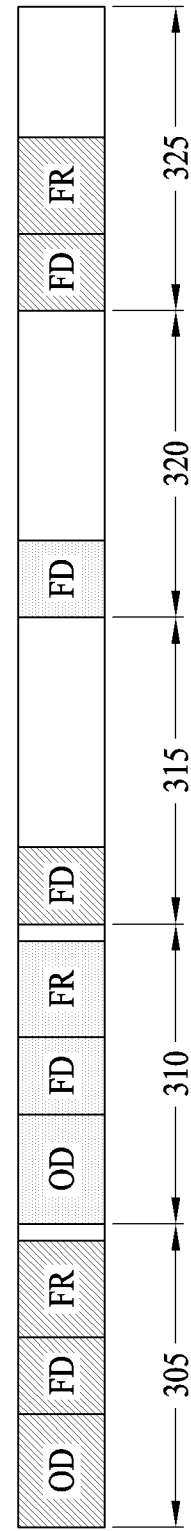
FIG. 3 illustrates an example method of controlling an apparatus with image recognition-based security by performing an operation differently in different time intervals based on an operation mode, according to one or more embodiments.

FIG. 3 illustrates an example method of controlling an apparatus with image recognition-based security by performing an operation differently in different time intervals based on an operation mode, according to one or more embodiments.

An apparatus (e.g., an apparatus of FIG. 2, the terminal 110, or an apparatus 700 of FIG. 7, as non-limiting examples) of an example embodiment may periodically receive an input frame at regular time intervals from a terminal (e.g., the terminal 110 of FIG. 1). The apparatus may be controlled to perform an operation corresponding to an operation mode determined for an input frame.

In the example of FIG. 3, the apparatus may be controlled to perform, on an input frame, unauthorized object detection (indicated as OD in FIG. 3), face detection (indicated as FD in FIG. 3), and face recognition (indicated as FR in FIG. 3) on a detected face, in a first time interval 305. The apparatus may fail in face recognition in the first time interval 305. As or when face recognition fails, the apparatus may set the terminal to be in a locked state.

In a second time interval 310, the apparatus may verify an operation history and verify that the terminal is locked as or when face recognition fails, and determine an operation mode for performing all of object detection OD, face detection FD, and detected face recognition FR. In contrast, the apparatus may succeed in face recognition in the first time interval 305. As or when face recognition succeeds, the apparatus may set or maintain the terminal to be in an unlocked state.

In a third time interval 315, a fourth time interval 320, and a fifth time interval 325, there may be no change in a normal environment, for example, a working environment, an online meeting environment, an online learning environment, and an online test environment, for example. In the third time interval 315 and the fourth time interval 320, the apparatus may perform only face detection FD on the input frame based on the operation history, face tracking, and a background region change. When a face is detected in the input frame, the apparatus may maintain the unlocked state of the terminal.

In the fifth time interval 325, the normal environment, for example, a working environment, an online meeting environment, an online learning environment, and an online test environment, may be maintained, and thus the apparatus may not detect a background region change. The apparatus may determine that a state maintenance time of the terminal passes a preset time based on the operation history and perform face detection FD and face recognition FR, for the purpose of maintenance. When face detection FD and face recognition FR succeed, the apparatus may set a state of the terminal to be the unlocked state and initialize the state maintenance time.

The apparatus may efficiently use computing resources by performing only predetermined or necessary operation on an input frame as described above with reference to FIG. 3, and reduce a false acceptance that may intermittently occur when object detection OD, face detection FD, and detected face recognition FR are all performed on all input frames.

Figure 4:
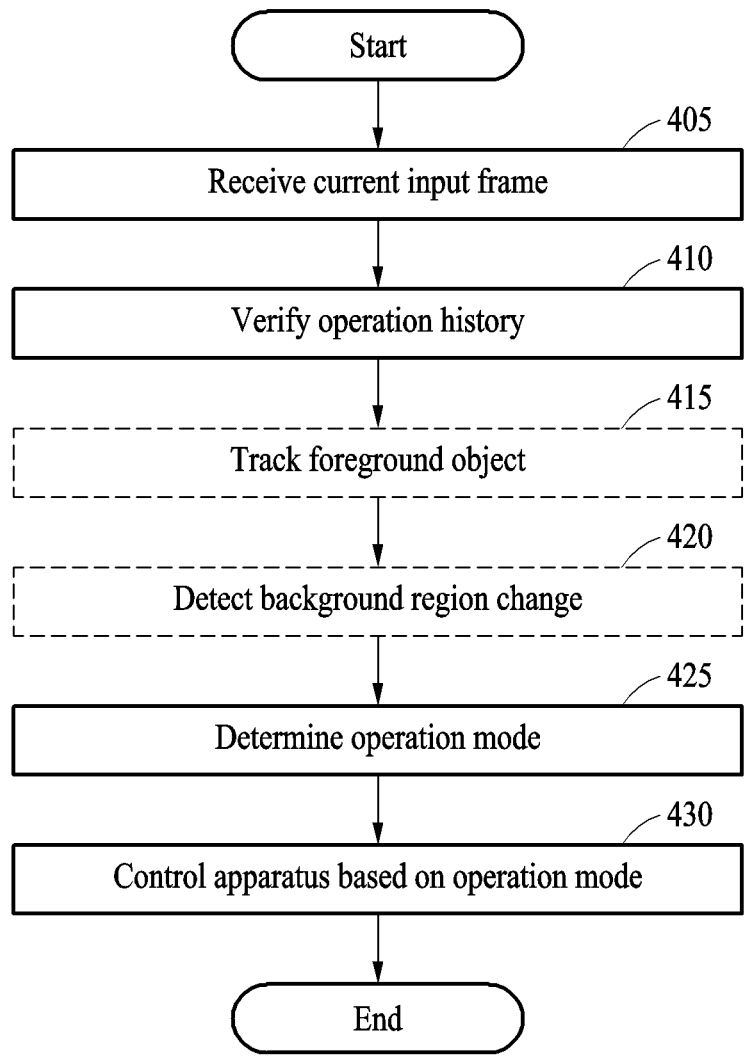
FIG. 4 illustrates an example of a method with image recognition-based security, according to one or more embodiments.

FIG. 4 illustrates an example of a method with an image recognition-based security, according to one or more embodiments.

Referring to FIG. 4, in operation 405, an apparatus (e.g., the terminal 110, an apparatus of FIG. 2, or apparatus 700 of FIG. 7, as non-limiting examples) of an example embodiment may receive a current input frame from a terminal (e.g., the terminal 110 of FIG. 1).

In operation 410, the apparatus may verify an operation history associated with at least one previous input frame to determine an operation to be performed on the current input frame. The operation history may include at least one of, for example, a result of tracking a foreground object in previous input frames, a result of detecting a background region change, an operation mode determined from previous input frames, information on whether unauthorized object detection, face detection, and face recognition are performed on previous input frames, a result of performing unauthorized object detection, face detection, and face recognition, a current state as to whether the terminal is locked or not, and a reason for the current state. However, examples of the operation history are not limited thereto, and the operation history may include histories of all or other operations performed on previous input frames.

In an example, the apparatus may identify, as the operation history, the current state as to whether the terminal is locked or unlocked and the reason for the current state, based on a result of processing the previous input frame. However, examples are not limited thereto, and the apparatus may verify the histories of all the operations performed on previous input frames.

In operation 415, the apparatus may track, in the current input frame, a foreground object detected in the previous input frame and output a tracking reliability as a result of the tracking. A greater tracking reliability may indicate that there may be a higher probability that the foreground object detected in the previous input frame is present in the current input frame.

In operation 420, the apparatus may detect a background region change between the previous input frame and the current input frame. When there is a region of the foreground object tracked in operation 415 the apparatus may determine, as a background region, a region in the current input frame from which the region of the foreground object is excluded.

In operation 420, the apparatus may determine a threshold value of a background change based on the region of the foreground object tracked in operation 415. As a user (e.g., the user 105 of FIG. 1) is closer to a camera of the terminal, a region occupied by a face of the user in an image of an input frame may increase in size. In contrast, as the user is further away from the camera of the terminal, the region occupied by the face of the user in the image of the input frame may decrease in size. The apparatus may determine the threshold value of the background change based on the determined size of the region of the foreground object tracked in operation 415. When determining the threshold value of the background change, the apparatus may not consider the tracking reliability.

The apparatus may compare a background region in the previous input frame and a background region in the current input frame based on the determined background region and the threshold value. When a difference in the size between the background regions meets the threshold value, e.g., is greater than the threshold value, the background region change may be detected. When the difference in the size between the background regions fails to meet the threshold value, e.g., is less than or equal to the threshold value, the background region change may not be detected.

The apparatus may or may not perform at least one of operation 415 of tracking, in the current input frame, the foreground object detected in the previous input frame and operation 420 of detecting the background region change between the previous input frame and the current input frame, based on the operation history verified in operation 410, to determine an operation mode.

For example, when the apparatus verifies in operation 410 that the terminal is currently unlocked as or when face recognition succeeds, the apparatus may track the face detected in the previous input frame in operation 415. In this example, in operation 420, the apparatus may determine the threshold value of the background region change based on the region of the tracked face, and detect the background region change between the previous input frame and the current input frame based on the background region excluding the region of the face tracked in the current input frame and on the determined threshold value.

When the apparatus verifies in operation 410 that the terminal is currently locked because a foreground object is not detected in the previous input frame, the apparatus may not perform operation 415 because there may be no foreground object to be tracked in the current input frame, but detect the background region change between the previous input frame and the current input frame in operation 420.

When the apparatus verifies in operation 410 that the terminal is currently locked because an unauthorized object is detected in the previous input frame, the apparatus may not perform operation 420, but track, in the current input frame, the unauthorized object detected in the previous input frame and output the tracking reliability in operation 415.

When the apparatus verifies in operation 410 that the terminal is currently locked because a plurality of faces are detected in the previous input frame, the apparatus may not perform operations 415 and 420. When a plurality of faces are detected, it may be desirable to continuously perform face detection and face recognition. Thus, the operation mode may be determined to be an operation mode for performing face detection and face recognition, and operations 415 and 420 may not desirably be performed to determine the operation mode.

However, whether to perform operation 415 and operation 420 based on a result of performing operation 410 is not limited to the foregoing example, and various operation histories may be considered to determine whether to perform or not to perform at least one of operation 415 and operation 420.

In operation 425, the apparatus may determine the operation mode based on the operation history verified in operation 410, and results of operations 415 and 420. In operation 430, the apparatus may be controlled to perform or not to perform at least one of face detection, face recognition, and unauthorized object detection according to each operation mode.

Figure 5A:
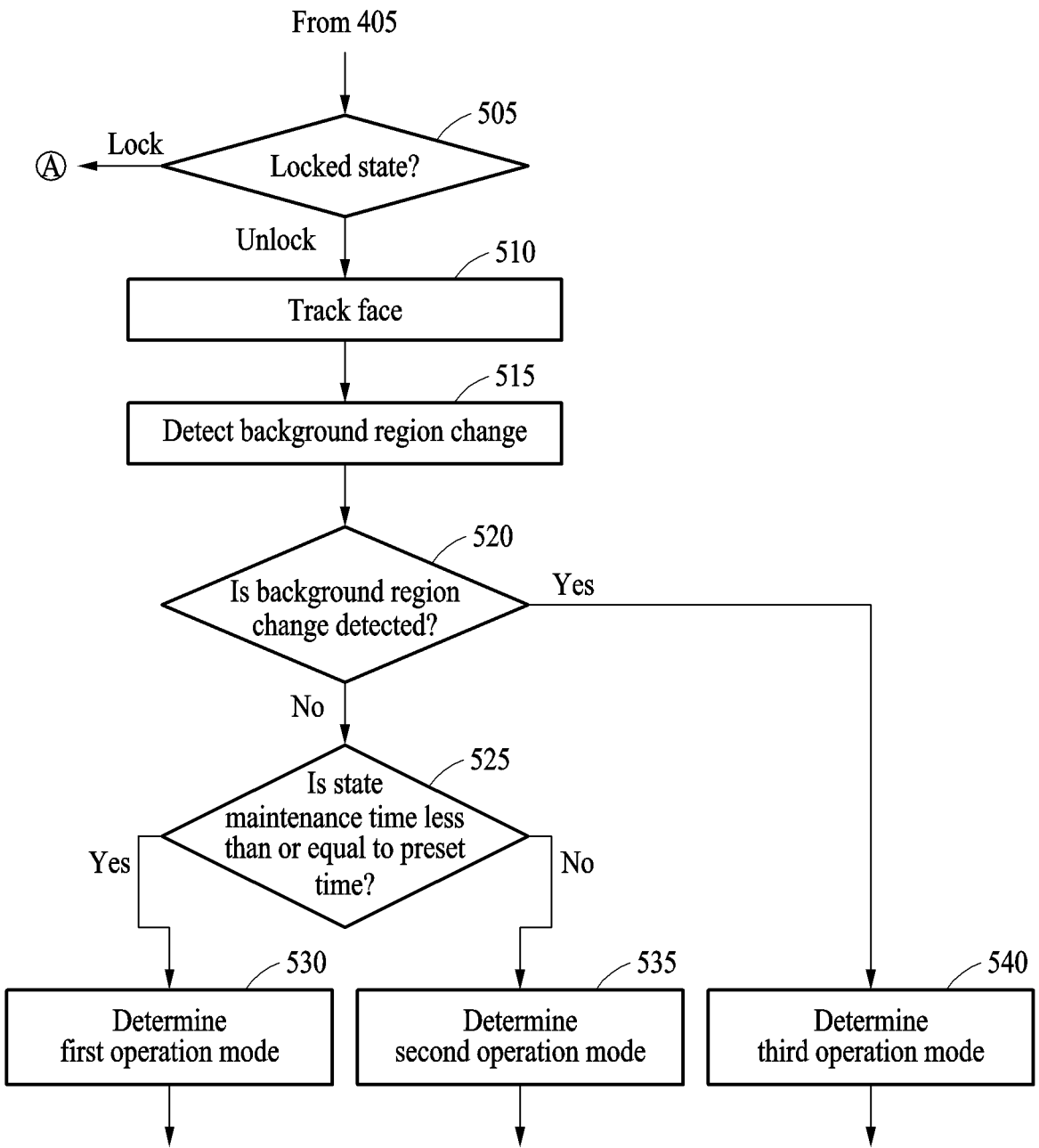
FIGS. 5A through 5C illustrate examples of determining an operation mode for an input frame in methods with image recognition-based security, according to respective one or more embodiments.
Figure 5B:
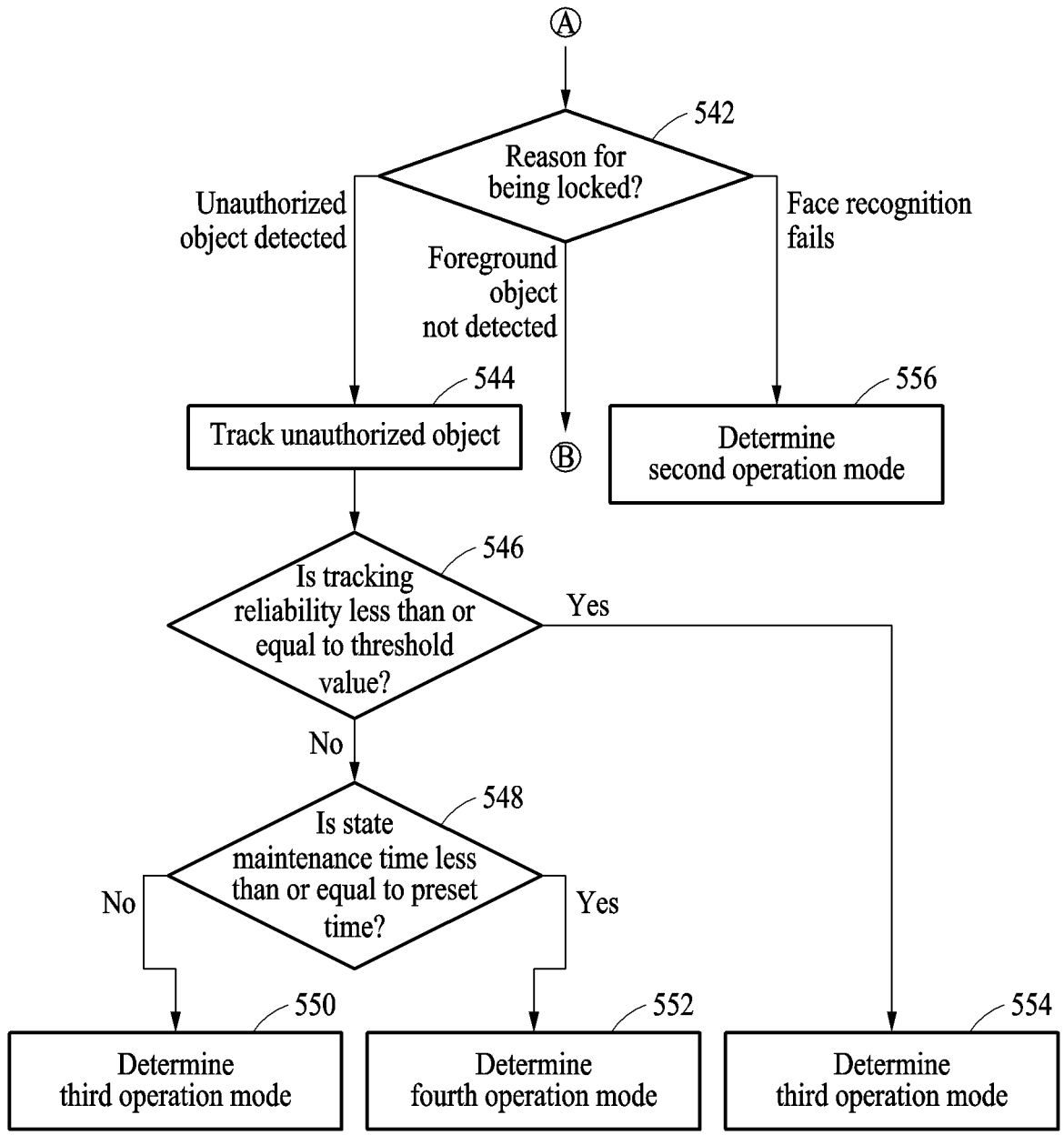
Figure 5C:
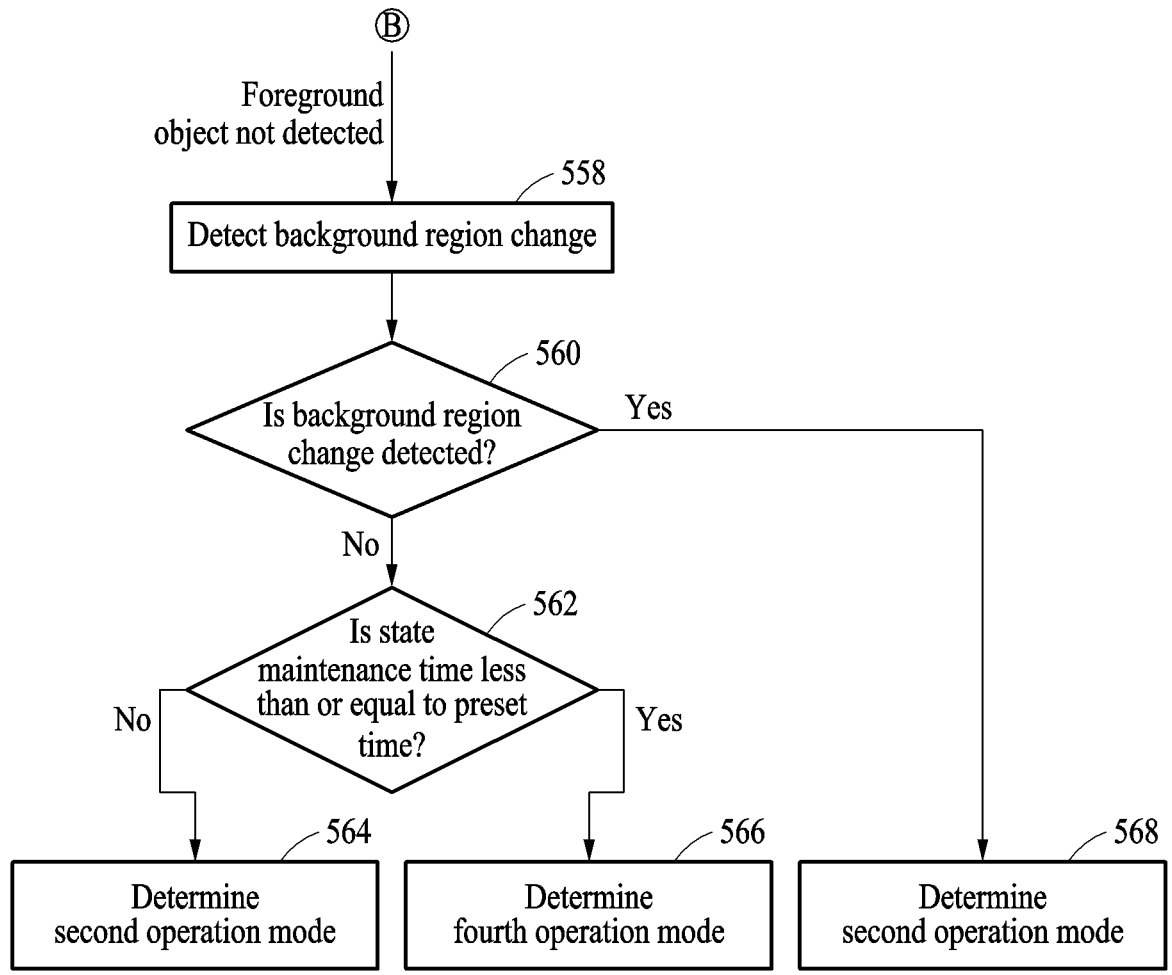

FIGS. 5A through 5C illustrate examples of determining an operation mode for an input frame in a method with image recognition-based security.

Referring to FIG. 5A, in operation 505, an apparatus (e.g., the terminal 110, an apparatus of FIG. 2, or apparatus 700 of FIG. 7, as non-limiting examples) may determine whether a terminal (e.g., the terminal 110 of FIG. 1) is in a locked state or in an unlocked state. That the terminal is in the unlocked state may indicate that the terminal is currently unlocked as or when face detection and face recognition performed on a previous input frame succeed.

In operation 510, when the terminal is in the unlocked state, the apparatus may track, in a current input frame, a face detected in the previous input frame. As a non-limiting example, operation 510 may correspond to operation 415 described above with reference to FIG. 4, for example.

In operation 515, the apparatus may detect a background region change between the previous input frame and the current input frame based on a region of the face tracked in operation 510. As a non-limiting example, operation 515 may correspond to operation 420 described above with reference to FIG. 4, for example. The apparatus may determine, as a background region, a region excluding the region of the face tracked in operation 510, and determine a threshold value of the background region change based on the size of the region of the tracked face. The apparatus may determine a difference in size of the background region by comparing the previous input frame and the current input frame based on the determined background region. When the difference in the size of the background region meets a threshold value, e.g., is greater than or equal to the threshold value, the background region change may be detected.

In operation 520, the apparatus may determine whether the background region change between the previous input frame and the current input frame is detected. In operation 525, when the background region change is not detected, the apparatus may determine whether a state maintenance time of the terminal fails to meet a preset time, e.g., is less than or equal to the preset time. The state maintenance time may be a time during which the locked state or the unlocked state of the terminal is maintained.

In operation 530, when the state maintenance time fails to meet the preset time, the apparatus may determine the operation mode to be a first operation mode. The first operation mode may be an operation mode in which only face detection is performed on the current input frame. When the terminal is currently unlocked as or when face recognition is successful with the previous input frame and the background region change is not detected in the current input frame, it may be predetermined or likely that a normal environment of the previous input frame, for example, a telecommuting environment, an online meeting environment, an online learning environment, and an online test environment, continues even in the current input frame. Thus, the apparatus may determine that there may be no security issue even when face recognition is not performed on the current input frame.

In the first operation mode, the apparatus may perform only face detection on the current input frame. When a face is detected, the apparatus may maintain the unlocked state without performing face recognition, and thereby may efficiently use computing resources.

In operation 535, when the state maintenance time meets the preset time, e.g., is greater than the preset time, the apparatus may determine the operation mode to be a second operation mode. The second operation mode may be an operation mode in which face detection, face recognition, and unauthorized object detection are sequentially performed on the current input frame. That the state maintenance time meets the preset time, e.g., is greater than the preset time, may indicate that there is no significant change in the environment throughout a plurality of frames. However, even when the environment of the previous input frame is maintained throughout a plurality of frames, face detection, detected face recognition, and unauthorized object detection may desirably be performed at predetermined intervals for security maintenance. When the terminal is in the unlocked state, it may be predetermined or likely that a situation in which telecommuting, online meeting, online learning, and online test are being performed normally at a time at which the current input frame is received. Thus, the apparatus may determine the operation mode to be the second operation mode to perform face detection and face recognition first and then perform unauthorized object detection.

In operation 540, when the background region change is detected in operation 520, the apparatus may determine the operation mode to be a third operation mode. The third operation mode may be an operation mode in which unauthorized object detection, face detection, and face recognition are sequentially performed on the current input frame. When the background region change is detected in the current input frame while the terminal is unlocked, it may be predetermined or likely that an unauthorized object appears as in a case in which a user (e.g., the user 105 in FIG. 1) uses a mobile phone. Thus, the apparatus may determine the operation mode to be the third operation mode to perform unauthorized object detection first and then perform face detection and face recognition sequentially.

As non-limiting examples, operations 520, 525, 530, 535, and 540 may correspond to operation 425 described above with reference to FIG. 4.

Referring to FIG. 5B, in operation 542, when the terminal is in a locked state in operation 505, the apparatus may verify an operation history and determine a reason for the terminal being locked. As non-limiting examples, operations 505 and 542 may correspond to operation 410 described above with reference to FIG. 4.

In operation 544, when the apparatus verifies in operation 542 that the terminal is locked as an unauthorized object is detected, the apparatus may track, in a current input frame, an unauthorized object detected in a previous input frame. In operation 546, the apparatus may determine whether a tracking reliability output by the tracking in operation 544 fails to meet a threshold value, e.g., is less than or equal to the threshold value. The threshold value may be determined in advance. A greater tracking reliability may indicate that a foreground object detected in the previous input frame is more likely to be present in the current input frame. As a non-limiting example, operation 544 may correspond to operation 415 described above with reference to FIG. 4.

In operation 548, when the tracking reliability meets the threshold value, e.g., is greater than the threshold value, the apparatus may determine whether a state maintenance time of the terminal fails to meet a preset time, e.g., is less than or equal to the preset time. In operation 548, the state maintenance time may be a time during which the locked state is maintained as an unauthorized object is detected. When the tracking reliability meets the threshold value, e.g., is greater than the threshold value, there may be a high probability that an unauthorized object is present in the current input frame. Thus, when the state maintenance time fails to meet the preset time, e.g., is less than or equal to the preset time, the apparatus may determine the operation mode to be a fourth operation mode. The fourth operation mode may be an operation mode for maintaining the locked state of the terminal without performing unauthorized object detection, face detection, and face recognition. When the unauthorized object is tracked in the current input frame, the apparatus may maintain the locked state of the terminal without performing other operations, and thereby may prevent computing resources from being wasted. When the state maintenance time meets the preset time, e.g., is greater than the preset time, unauthorized object detection may desirably be performed for more accurate determination even though the unauthorized object is tracked in the current input frame. In operation 550, when the state maintenance time meets the preset time, e.g., is greater than the preset time, the apparatus may determine the operation mode to be the third operation mode. The third operation mode may be an operation mode in which unauthorized object detection, face detection, and face recognition are sequentially performed. Since the terminal is locked as the unauthorized object is detected at a time at which the current input frame is received, the apparatus may determine the operation mode to be the third operation mode to perform unauthorized object detection first.

When the tracking reliability fails to meet the threshold value, e.g., is less than or equal to the threshold value, in operation 546, the apparatus may determine that it is unlikely that the unauthorized object detected in the previous input frame is present in the current input frame, and thus the apparatus may determine the operation mode to be the third operation mode. The apparatus may determine the operation mode to be the third operation mode to determine first whether the unauthorized object is present in the current input frame.

In operation 556, when the apparatus verifies in operation 542 that the terminal is locked as or when face recognition fails, the apparatus may determine the operation mode to be the second operation mode. Face recognition may fail when a plurality of faces are detected in the current input frame or when a detected one face is not a face of an authorized user. When face recognition fails, the apparatus may determine the operation mode to be the second operation mode to perform face detection and face recognition first for each input frame.

As a non-limiting examples, operations 546, 548, 550, 552, 554, and 556 may correspond to operation 425 described above with reference to FIG. 4.

Referring to FIG. 5C, in operation 558, when is the apparatus verifies in operation 542 that the terminal is locked because a foreground object is not detected in the previous input frame, the apparatus may detect a background region change between the previous input frame and the current input frame. When the terminal is locked because a foreground object is not detected in the previous input frame, the apparatus may not perform an operation of tracking a foreground object because there is no foreground object to be tracked in the current input frame.

In operation 558, the background region change may be detected when a difference in the size of a background region between the previous input frame and the current input frame meets a threshold value, e.g., is greater than or equal to the threshold value. In operation 558, the threshold value may be a value set in advance. As a non-limiting example, operation 558 may correspond to operation 420 described above with reference to FIG. 4.

In operation 562, when the background region change is not detected, the apparatus may determine whether a state maintenance time fails to meet a preset time, e.g., is less than or equal to a preset time. In operation 562, the state maintenance time may be a time during which the locked state of the terminal is maintained because a foreground object is not detected.

In operation 566, when the state maintenance time fails to meet the preset time, e.g., is less than or equal to the preset time, the apparatus may determine the operation mode to be a fourth operation mode. That the foreground object is not detected may indicate that the user is absent. When the user is absent, performing face detection, face recognition, and unauthorized object detection on each input frame may waste computing resources. To prevent such a waste of computing resources, the apparatus may determine the operation mode to be the fourth operation mode to maintain the locked state of the terminal without performing face detection, face recognition, and unauthorized object detection.

In operation 564, when the state maintenance time meets the preset time, e.g., is greater than the preset time, in operation 562, the apparatus may determine the operation mode to be a second operation mode for an accurate determination for an input frame. In operation 568, the apparatus may determine the operation mode to be the second operation mode because, when the background region change is detected in operation 560, there may be a high probability that the user appears in an image. In the second operation mode, face detection, face recognition, and unauthorized object detection may be performed sequentially.

As non-limiting examples, operations 560, 562, 564, 566, and 568 may correspond to operation 425 described above with reference to FIG. 4.

In another example, the apparatus may verify an operation history associated with a plurality of input frames to accurately determine a situation in a current input frame and determine the operation mode.

For example, when a background region change is detected in operation 520, the apparatus may further determine whether face recognition is successful with a predetermined number of recently input frames based on the current input frame. When face recognition is successful with the recently input frames, the apparatus may determine or be more certain that telecommuting, online meetings, online learning, or online tests is being normally performed at a time at which the current input frame is received. In operation 525, when face recognition is successful with the predetermined number of recently input frames, the apparatus may determine whether the state maintenance time meets the preset time, e.g., is less than or equal to the preset time. When face recognition is not successful with any one of the predetermined number of recently input frames, the apparatus may determine the operation mode to be the second operation mode.

When the tracking reliability meets the threshold value, e.g., is greater than the threshold value, in operation 546, the apparatus may further determine whether an unauthorized object is detected in the predetermined number of recently input frames based on the current input frame. When the unauthorized object is detected in the recently input frames, the apparatus may determine or be more certain that the unauthorized object is present at a time at which the current input frame is received. In operation 548, when the unauthorized object is detected in the predetermined number of recently input frames, the apparatus may determine whether the state maintenance time meets the preset time, e.g., is less than or equal to the preset time. When the unauthorized object is not detected in any one of the predetermined number of recently input frames, the apparatus may determine the operation mode to be the third operation mode.

When a background region change is not detected in operation 560, the apparatus may further determine whether a background region change is detected in the predetermined number of recently input frames and whether a foreground object is detected in the predetermined number of recently input frames, based on the current input frame. When the foreground object is not detected and the background region change is not detected in the recently input frames, the apparatus may determine or be more certain that a state in which the user is absent is maintained at a time at which the current input frame is received. When the foreground object is not detected and the background region change is not detected in the predetermined number of recently input frames, the apparatus may determine whether the state maintenance time meets the preset time, e.g., is less than or equal to the preset time, in operation 562. When the foreground object or the background region change is detected in any one of the predetermined number of recently input frames, the apparatus may determine the operation mode to be the second operation mode.

However, examples are not limited to the examples of FIGS. 5A through 5C, but conditions for determining the operation mode and the operation mode determined when each condition is satisfied may be set in various ways. For example, in operation 556, the apparatus may determine the operation mode to be the third operation mode, instead of the second operation mode.

Figure 6A:
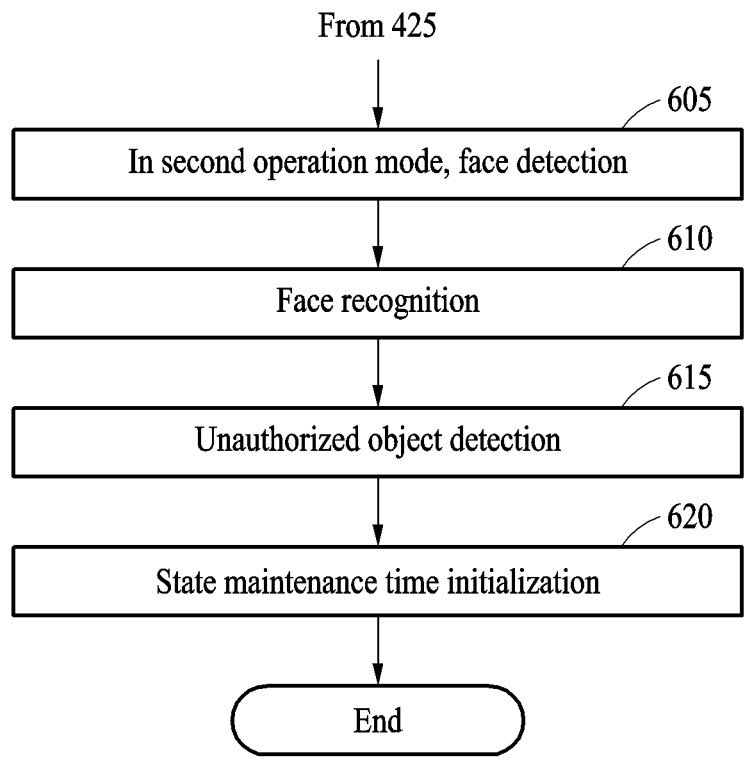
FIGS. 6A and 6B illustrate example methods with image recognition-based security, according to respective one or more embodiments.
Figure 6B:
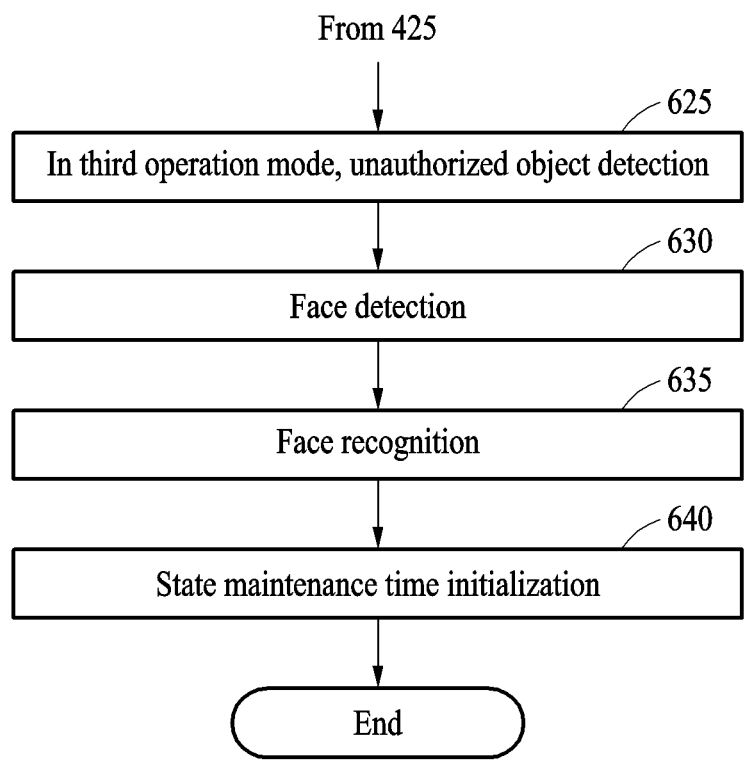

FIGS. 6A and 6B illustrate example methods with image recognition-based security, according to respective one or more embodiments.

An apparatus (e.g., the terminal 110, an apparatus of FIG. 2, or an apparatus 700 of FIG. 7, as non-limiting examples) may be controlled to perform face detection on a current input frame in a first operation mode determined in operation 530 described above with reference to FIG. 5A. For example, when a terminal (e.g., the terminal 110 in FIG. 1) is in an unlocked state at a time at which the current input frame is received and a background region change is not detected in the current input frame, there may be a high probability that a current user (e.g., the user 105 in FIG. 1) is in a normal telecommuting environment, a normal online meeting environment, a normal online learning environment, or a normal online test environment. Since the user may move less in such a normal environment such as the telecommuting environment, the online meeting environment, the online learning environment, or the online test environment, there may be no security issue even when face recognition is not performed repeatedly.

Referring to FIG. 6A, the apparatus may be controlled to sequentially perform an operation 605 for face detection, an operation 610 for face recognition, and an operation 615 for unauthorized object detection on a current input frame in a second operation mode.

In operation 620, the apparatus may be controlled to initialize a state maintenance time of the terminal. When the second operation mode is determined in operation 535 of FIG. 5A, the state maintenance time may be a time during which the unlock state is maintained, and may be initialized after operation 605 for face detection, operation 610 for face recognition, and operation 615 for unauthorized object detection are performed on the current input frame according to the second operation mode. When the second operation mode is determined in operation 556 of FIG. 5B and in operations 564 and 568 of FIG. 5C, the state maintenance time may be a time during which the locked state is maintained, and may be initialized after operation 605 for face detection, operation 610 for face recognition, and operation 615 for unauthorized object detection are performed on the current input frame according to the second operation mode.

Referring to FIG. 6B, the apparatus may be controlled to sequentially perform operation 625 for unauthorized object detection, operation 630 for face detection, and operation 635 for face recognition on a current input frame in a third operation mode.

In operation 640, the apparatus may be controlled to initialize a state maintenance time of the terminal. When the third operation mode is determined in operation 540 of FIG. 5A, the state maintenance time may be a time during which the unlocked state is maintained, and may be initialized after operation 625 for unauthorized object detection, operation 630 for face detection, and operation 635 for face recognition are performed on the current input frame according to the third operation mode. When the third operation mode is determined in operation 550 and operation 554 of FIG. 5B, the state maintenance time may be a time during which the locked state is maintained, and may be initialized after operation 625 for unauthorized object detection, operation 630 for face detection, and operation 635 for face recognition are performed on the current input frame according to the third operation mode.

The state maintenance time may be initialized when any one of an operation for face recognition (e.g., operations 610 and 635) and an operation for unauthorized object detection (e.g., operations 615 and 625) is performed.

The apparatus may be controlled to maintain the locked state of the terminal without performing the operations for face detection, face recognition, and unauthorized object detection on the current input frame, in a fourth operation mode determined in operation 552 of FIG. 5B and operation 566 of FIG. 5C. When the operation mode is determined as the fourth operation mode, the apparatus may maintain the locked state of the terminal without performing an operation on the current input frame, and thereby may prevent a waste of computing resources.

The first to fourth operation modes are provided merely as examples of an operation mode, and other various operation modes may also be set. The operation mode may be set to be other operation modes, other than the first to fourth operation modes, based on an operation history of the apparatus, a result of tracking a foreground object, and a result of detecting whether there is a background region change. For example, in operation 535 of FIG. 5A, the apparatus may determine the operation mode to be a fifth operation mode in which face detection and face recognition are performed and unauthorized object detection is not performed, instead of the second operation mode.

Figure 7:
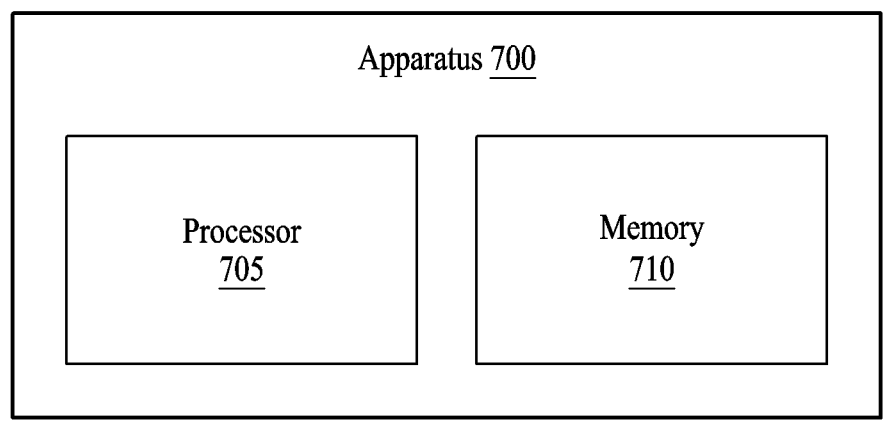
FIG. 7 illustrates an example apparatus with image recognition-based security, according to one or more embodiments.

FIG. 7 illustrates an example apparatus with an image recognition-based security, according to one or more embodiments.

Referring to FIG. 7, an apparatus 700 may include at least one processor 705 and at least one memory 710 configured to store therein instructions to be executed by the processor 705.

The processor 705 may receive a current input frame from a terminal (e.g., the terminal 110 of FIG. 1). The processor 705 may verify an operation history associated with at least one previous input frame to determine an operation to be performed on the current input frame. The operation history may be stored in the memory 710.

In an example, the processor 705 may verify, as the operation history, a current state as to whether the terminal is locked or unlocked and a reason for the current state based on a result of processing the previous input frame. However, examples are not limited thereto, and the processor 705 may verify histories or results of all operations performed on previous input frames.

The processor 705 may or may not perform at least one of an operation of tracking, in the current input frame, a foreground object detected in the previous input frame and an operation of detecting a background region change between the previous input frame and the current input frame, based on the verified operation history, to determine an operation mode suitable for a current situation.

The processor 705 may track, in the current input frame, the foreground object detected in the previous input frame, and output a tracking reliability as a result of the tracking.

The processor 705 may detect the background region change between the previous input frame and the current input frame. When there is a region of the foreground object tracked in the current input frame, the apparatus 700 may determine, as a background region, a region excluding the region of the foreground object in the current input frame.

The processor 705 may determine a threshold value of a background change based on the region of the tracked foreground object. The processor 705 may determine the threshold value of the background change based on the size of the region of the tracked foreground object in the current input frame. When determining the threshold value of the background change, the apparatus 700 may not consider the tracking reliability.

The processor 705 may compare a background region in the previous input frame and a background region in the current input frame based on the determined background region and the threshold value. When a difference in the size of the background region meets the threshold value, e.g., is greater than the threshold value, the background region change may be detected. In contrast, when the difference in the size of the background region fails to meet the threshold value, e.g., is less than the threshold value, the background region change may not be detected. The operation of verifying the operation history associated with the previous input frame, the operation of tracking the foreground object in the current input frame, and the operation of detecting the background region change that are performed by the apparatus 700 may correspond to operation 410, operation 415, and operation 420, respectively, as non-limiting examples, and thus additional detailed and repeated description of these operations will be omitted here for brevity.

The processor 705 may determine an operation mode based on the verified operation history, and results of the operation of tracking a foreground object and the operation of detecting a background region change. The processor 705 may or may not perform at least one of face detection, face recognition, and unauthorized object detection on the current input frame according to each operation mode.

When the terminal is in the unlocked state based on the operation history, the processor 705 may track, in the current input frame, a face detected in the previous input frame.

The processor 705 may detect a background region change between the previous input frame and the current input frame based on a region of the tracked face. The processor 705 may determine, as a background region, a region excluding the region of the face tracked in the current input frame, and determine a threshold value of the background region change based on the size of the region of the tracked face. The processor 705 may determine a difference in the size of the background region by comparing the previous input frame and the current input frame based on the determined background region. When the difference in the size of the background region meets the threshold value, e.g., is greater than or equal to the threshold value, the background region change may be detected.

The processor 705 may determine whether the background region change between the previous input frame and the current input frame is detected. When the background region change is not detected, the processor 705 may determine whether a state maintenance time of the terminal meets a preset time, e.g., is less than or equal to the preset time. The state maintenance time may refer to a time during which the locked state or the unlocked state of the terminal is maintained.

When the state maintenance time fails to meet the preset time, e.g., is less than or equal to the preset time, the processor 705 may determine the operation mode to be a first operation mode. In the first operation model, the processor 705 may perform only face detection on the current input frame and maintain the unlocked state without performing face recognition when the face is detected, thereby effectively using computing resources.

When the state maintenance time meets the preset time, e.g., is greater than the preset time, the processor 705 may determine the operation mode to be a second operation mode. That the state maintenance time meets the preset time, e.g., is greater than the preset time, may indicate that there is no great change in a telecommuting environment, an online meeting environment, an online learning environment, or an online test environment throughout a plurality of frames. Even when an environment of the previous input frame is maintained throughout a plurality of frames, face detection, detected face recognition, and unauthorized object detection may desirably be performed at predetermined intervals for security maintenance. In a case in which the terminal is in the unlocked state, there may be a high probability that telecommuting, online meeting, online learning, or online test continues being performed normally at a time at which the current input frame is received, and thus the processor 705 may determine the operation mode to be the second operation mode to perform first face detection and face recognition and then perform unauthorized object detection.

When the background region change is detected in the current input frame while the terminal is in the unlocked state, the processor 705 may determine the operation mode to be a third operation mode. When the background region change is detected in the current input frame while the terminal is unlocked, there may be a high probability that an unauthorized object appears, as in a case in which a user (e.g., the user 105 of FIG. 1) uses a mobile phone, and thus the processor 705 may determine the operation mode to be the third operation mode to perform first unauthorized object detection and then perform face detection and face recognition sequentially.

As non-limiting examples, operations performed by the processor 705 when the terminal is in the unlocked state may correspond to operations 520, 525, 530, 535, and 540 described above with reference to FIG. 5A, for example.

When the terminal is in the locked state, the processor 705 may verify a reason for the terminal being locked by verifying the operation history.

When the terminal is verified as being in the locked state as an unauthorized object is detected, the processor 705 may track, in the current input frame, the unauthorized object detected in the previous input frame. The processor 705 may determine whether a tracking reliability output by the tracking fails to meet a threshold value, e.g., is less than or equal to a threshold value. The threshold value may be determined in advance, i.e., predetermined.

When the tracking reliability meets the threshold value, e.g., is greater than the threshold value, the processor 705 may determine whether a state maintenance time of the terminal fails to meet a preset time, e.g., is less than or equal to a preset time. Here, the state maintenance time may refer to a time during which the locked state is maintained as the unauthorized object is detected. That the tracking reliability meets the threshold value, e.g., is greater than the threshold value, may indicate that there may be a high probability that the unauthorized object is present in the current input frame. Thus, when the state maintenance time fails to meet a preset time, e.g., is less than or equal to the preset time, the processor 705 may determine the operation mode to be a fourth operation mode.

When the terminal is locked as the unauthorized object is detected, the tracking reliability meets the threshold value, e.g., is greater than the threshold value, and the state maintenance time meets the preset time, e.g., is greater than the preset time, the processor 705 may determine the operation mode to be a third operation mode.

When the tracking reliability fails to meet the threshold value, e.g., is less than or equal to the threshold value, the processor 705 may determine the operation mode to be the third operation mode.

As non-limiting examples, operations performed by the processor 705 when the terminal is in the locked state due to the unauthorized object detected may correspond to operations 544, 546, 548, 550, 552, and 554 described above with reference to FIG. 5B, for example, and additional detailed and repeated description of the operations will be omitted here for brevity.

When the terminal is verified as being in the locked state because face recognition fails, the processor 705 may determine the operation mode to be the second operation mode. As a non-limiting example, operations performed by the processor 705 when the terminal is verified as being in the locked state because face recognition fails may correspond to operation 556 described above with reference to FIG. 5B, for example, and additional detailed and repeated description of the operations will be omitted here for brevity.

When the terminal is verified as being in the locked state because a foreground object is not detected in the previous input frame, the processor 705 may detect a background region change between the previous input frame and the current input frame. When the terminal is verified as being in the locked state due to the foreground object not being detected in the previous input frame, the processor 705 may not perform an operation of tracking a foreground object because there is no foreground object to be tracked in the current input fame. The background region change may be detected when a difference between a size of a background region in the previous input frame and a size of a background region in the current input frame meets a threshold value, e.g., is greater than or equal to the threshold value. In a case in which the terminal is locked as a foreground object is not detected in the previous input frame, the threshold value of the background region change may be a value determined in advance.

When the terminal is in the locked state because the foreground object is not detected in the previous input frame and the background region change is not detected, the processor 705 may determine whether the state maintenance time fails to meet the preset time, e.g., is less than or equal to the preset time. When the state maintenance time fails to meet the preset time, e.g., is less than or equal to the preset time, the processor 705 may determine the operation mode to be the fourth operation mode. In contrast, when the state maintenance time meets the preset time, e.g., is greater than the preset time, the processor 705 may determine the operation mode to be the second operation mode. As a non-limiting example, operations performed by the processor 705 when the terminal is in the locked state due to the foreground object not being detected in the previous input frame may correspond to operations 558, 560, 562, 564, 566, and 568 described above with reference to FIG. 5C, for example, and additional detailed and repeated description of the operations will be omitted here for brevity.

In another example, the processor 705 may verify an operation history associated with a plurality of input fames to accurately identify a situation in the current input frame and determine the operation mode.

For example, when the terminal is in the unlocked state and the background region change is not detected, the processor 705 may further determine whether face recognition is successful with a predetermined number of recently input frames based on the current input frame. When face recognition is successful with the recently input frames, the apparatus may determine or become more certain that telecommuting, online meetings, online learning, or online tests are being normally performed at a time at which the current input frame is received. When face recognition is successful with the predetermined number of recently input frames, the processor 705 may determine whether the state maintenance time fails to meet the preset time, e.g., is less than or equal to the preset time. When face recognition is not successful with any one of the predetermined number of recently input frames, the processor 705 may determine the operation mode to be the second operation mode.

When the terminal is in the locked state because an unauthorized object is detected and the tracking reliability meets the threshold value, e.g., is greater than the threshold value, the processor 705 may further determine whether the unauthorized object is detected in the predetermined number of recently input frames based on the current input frame. When the unauthorized object is detected in the recently input frames, the apparatus may determine or be more certain that the unauthorized object is present at a time at which the current input frame is received. When the unauthorized object is detected in the predetermined number of recently input frames, the processor 705 may determine whether the state maintenance time fails to meet the preset time, e.g., is less than or equal to the preset time. When the unauthorized object is not detected in any one of the predetermined number of recently input frames, the processor 705 may determine the operation mode to be the third operation mode.

When the terminal is in the locked state because a foreground object is not detected in the previous input frame and the background region change is not detected in the current input frame, the processor 705 may further determine whether the background region change is detected in the predetermined number of recently input frames and further determine whether the foreground object is detected in the predetermined number of recently input frames, based on the current input frame. When the foreground object and the background region change are not detected in the recently input frames, the apparatus may determine or be more certain that a state in which the user is absent is maintained at a time at which the current input frame is received. When the foreground object and the background region change are not detected in the predetermined number of recently input frames, the processor 705 may determine whether the state maintenance time fails to meet the preset time, e.g., is less than or equal to the preset time. When the foreground object or the background region change is detected in any one of the predetermined number of recently input frames, the processor 705 may determine the operation mode to be the second operation mode.

The apparatuses, devices, units, modules, and components described herein with respect to FIGS. 1 through 7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:
1. A processor-implemented method, comprising:
   determining between a locked state and an unlocked state of a terminal; and
   when a result of the determining between the locked state and the unlocked state of the terminal is that the terminal is in the unlocked state:
   tracking, in a current frame, a face detected in a previous frame;

detecting for a background region change between the previous frame and the current frame based on a background region, of the current frame, distinguished from a region of the tracked face in the current frame;

when a result of the detecting for the background region change is that the background region change is not detected, determining whether a state maintenance time of the unlocked state fails to meet an unlocked state maintenance preset time, where the state maintenance time of the unlocked state is a time for which the unlocked state of the terminal has been maintained for one or more previous frames; and in response to the state maintenance time of the unlocked state failing to meet the unlocked state maintenance preset time, determining an operation mode to be a first operation mode for determining whether recognition succeeds for the current frame, performing the first operation mode, including performing face detection with respect to the current frame, and maintaining the unlocked state of the terminal for the current frame when the face is detected as a result of the performing of the face detection, representing that the recognition succeeded for the current frame.

2. The method of claim 1, further comprising, in response to the state maintenance time of the unlocked state meeting the unlocked state maintenance preset time:

determining the operation mode to be a second operation mode for the determining of whether the recognition succeeds for the current frame;

performing the second operation mode, including sequentially performing the face detection, facial recognition, and unauthorized object detection with respect to the current frame; and initializing the state maintenance time of the unlocked state.

3. The method of claim 1, further comprising, when the result of the detecting for the background region change is that the background region change is detected:

determining the operation mode to be a third operation mode for the determining of whether the recognition succeeds for the current frame;

performing the third operation mode, including sequentially performing unauthorized object detection, the face detection, and face recognition with respect to the current frame; and initializing the state maintenance time of the unlocked state.

4. The method of claim 1, further comprising, when the result of the determining between the locked state and the unlocked state is that is that the terminal is in the locked state, dependent on an unauthorized object having been detected in the previous frame:

tracking, in the current frame, for the detected unauthorized object;

determining whether a tracking reliability of a result of the tracking for the detected unauthorized object meets a threshold value;

in response to the tracking reliability meeting the threshold value, determining whether a state maintenance time of the locked state fails to meet a locked state maintenance preset time; and in response to the state maintenance time of the locked state failing to meet the locked state maintenance preset time, determining the operation mode to be a fourth operation mode for the determining whether the recognition succeeds for the current frame, and maintaining, for the fourth operation mode, the locked state of the terminal with respect to the current frame.

5. The method of claim 4, further comprising, in response to the tracking reliability failing to meet the threshold value:

determining the operation mode to be a third operation mode for the determining of whether the recognition succeeds for the current frame;

performing the third operation mode, including sequentially performing unauthorized object detection, the face detection, and face recognition with respect to the current frame; and initializing the state maintenance time of the locked state.

6. The method of claim 4, further comprising, in response to the state maintenance time of the locked state meeting the locked state maintenance preset time:

determining the operation mode to be a third operation mode for the determining of whether the recognition succeeds for the current frame;

performing the third operation mode, including sequentially performing unauthorized object detection, the face detection, and face recognition with respect to the current frame; and initializing the state maintenance time of the locked state.

7. The method of claim 1, further comprising, when the result of the determining between the locked state and the unlocked state is that is that the terminal is in the locked state, dependent on a foreground object having not been detected in the previous frame:

performing the detecting for the background region change between the previous frame and the current frame;

when a result of the performing of the detecting for the background region change is that the background region change is not detected, determining whether a state maintenance time of the locked state fails to meet a locked state maintenance preset time; and in response to the state maintenance time of the locked state failing to meet the locked state maintenance preset time, determining the operation mode to be a fourth operation mode for the determining whether the recognition succeeds for the current frame, and maintaining, for the fourth operation model, the locked state of the terminal with respect to the current frame.

8. The method of claim 7, further comprising, when the result of the performing of the detecting for the background region change is that the background region change is detected:

determining the operation mode to be a second operation mode for the determining of whether the recognition succeeds for the current frame;

performing the second operation mode, including sequentially performing the face detection, face recognition, and unauthorized object detection with respect to the current frame; and initializing the state maintenance time.

9. The method of claim 7, further comprising, when the result of the performing of the detecting for the background region change is that the background region change is not detected, and the state maintenance time of the locked state meets the locked state maintenance preset time:

determining the operation mode to be a second operation mode for the determining of whether the recognition succeeds for the current frame; and performing the second operation mode, including sequentially performing the face detection, face recognition, and unauthorized object detection with respect to the current frame.

10. The method of claim 1, further comprising, when the result of the determining between the locked state and the unlocked state is that the terminal is in the locked state, dependent on a face recognition for the previous frame having failed or a plurality of faces having been detected in the previous frame:
  determining the operation mode to be a second operation mode for the determining of whether the recognition succeeds for the current frame; and
  performing the second operation mode, including sequentially performing the face detection, face recognition, and unauthorized object detection with respect to the current frame.

11. The method of claim 1, wherein the detecting for the background region change comprises:
  determining a threshold value for the background region change based on the region of the tracked face;
  calculating a difference between a size of a background region in the previous frame and a size of a background region in the current frame; and
  detecting the background region change in response to the calculated difference meeting the threshold value.

12. An apparatus, comprising:
  one or more processors configured to:
  determine between a locked state and an unlocked state of a terminal; and
  when a result of the determination between the locked state and the unlocked state of the terminal is that the terminal is in the unlocked state:
  track, in a current frame, a face detected in a previous frame;
  detect for a background region change between the previous frame and the current frame based on a background region, of the current frame, distinguished from a region of the tracked face in the current frame;
  when a result of the detection for the background region change is that the background region change is not detected, determine whether a state maintenance time of the unlocked state fails to meet an unlocked state maintenance preset time, where the state maintenance time of the unlocked state is a time for which the unlocked state of the terminal has been maintained for one or more previous frames; and
  in response to the state maintenance time of the unlocked state failing to meet the unlocked state maintenance preset time,
  determine an operation mode to be a first operation mode for determining whether recognition succeeds for the current frame,
  perform the first operation mode, including performance of face detection with respect to the current frame, and
  maintain the unlocked state of the terminal for the current frame when the face is detected as a result of the performance of the face detection, representing that the recognition succeeded for the current frame.

13. The apparatus of claim 12, wherein the processor is configured to:
  in response to the state maintenance time of the unlocked state meeting the unlocked state maintenance preset time:
  determine the operation mode to be a second operation mode for the determining of whether the recognition succeeds for the current frame;
  perform the second operation mode, including a sequential performance of the face detection, facial recognition, and unauthorized object detection with respect to the current frame; and
  initialize the state maintenance time of the unlocked state.

14. The apparatus of claim 12, wherein the processor is configured to:
  when the result of the detection for the background region change is that the background region change is detected:
  determine the operation mode to be a third operation mode for the determining of whether the recognition succeeds for the current frame;
  perform the third operation mode, including a sequential performance of unauthorized object detection, the face detection, and face recognition with respect to the current frame; and
  initialize the state maintenance time of the unlocked state.

15. The apparatus of claim 12, wherein the processor is configured to:
  when the result of the determination between the locked state and the unlocked state is that is that the terminal is in the locked state, dependent on an unauthorized object having been detected in the previous frame:
  track, in the current frame, for the detected unauthorized object;
  determine whether a tracking reliability of a result of the tracking for the detected unauthorized object meets a threshold value;
  in response to the tracking reliability meeting the threshold value, determine whether a state maintenance time of the locked state fails to meet a locked state maintenance preset time; and
  in response to the state maintenance time of the locked state failing to meet the locked state maintenance preset time,
  determine the operation mode to be a fourth operation mode for the determining whether the recognition succeeds for the current frame, and
  maintain, for the fourth operation mode, the locked state of the terminal with respect to the current frame.

16. The apparatus of claim 15, wherein the processor is configured to:
  in response to the tracking reliability failing to meet the threshold value:
  determine the operation mode to be a third operation mode for the determining of whether the recognition succeeds for the current frame;
  perform the third operation mode, including a sequential performance of unauthorized object detection, the face detection, and face recognition with respect to the current frame; and
  initialize the state maintenance time of the locked state.

17. The apparatus of claim 15, wherein the processor is configured to:
  in response to the state maintenance time of the locked state meeting the locked state maintenance preset time:
  determine the operation mode to be a third operation mode for the determining of whether the recognition succeeds for the current frame;
  perform the third operation mode, including a sequential performance of unauthorized object detection, the face detection, and face recognition with respect to the current frame; and
  initialize the state maintenance time of the locked state.

18. The apparatus of claim 12, wherein the processor is configured to:

when the result of the determination between the locked state and the unlocked state is that is that the terminal is in the locked state, dependent on a foreground object having not been detected in the previous frame:
perform the detection for the background region change between the previous frame and the current frame;
when a result of the performance of the detection for the background region change is that the background region change is not detected, determine whether a state maintenance time of the locked state fails to meet a locked state maintenance preset time; and
in response to the state maintenance time of the locked state failing to meet the locked state maintenance preset time,
determine the operation mode to be a fourth operation mode for the determining whether the recognition succeeds for the current frame, and
maintain, for the fourth operation model, the locked state of the terminal with respect to the current frame.

19. The apparatus of claim 18, wherein the processor is configured to:
when the result of the performance of the detection for the background region change is that the background region change is detected:
determine the operation mode to be a second operation mode for the determining of whether the recognition succeeds for the current frame;
perform the second operation mode, including a sequential performance of the face detection, face recognition, and unauthorized object detection with respect to the current frame; and
initialize the state maintenance time.

20. The apparatus of claim 18, wherein the processor is configured to:
when the result of the performance of the detection for the background region change is that the background region change is not detected, and the state maintenance time of the locked state meets the locked state maintenance preset time:
determine the operation mode to be a second operation mode for the determining of whether the recognition succeeds for the current frame; and
perform the second operation mode, including a sequential performance of the face detection, face recognition, and unauthorized object detection with respect to the current frame.

21. The apparatus of claim 12, wherein the processor is configured to:
when the result of the determination between the locked state and the unlocked state is that the terminal is in the locked state, dependent on a face recognition for the previous frame having failed or a plurality of faces having been detected in the previous frame:
determine the operation mode to be a second operation mode for the determining of whether the recognition succeeds for the current frame;
perform the second operation mode, including a sequential performance of the face detection, face recognition, and unauthorized object detection with respect to the current frame; and
selectively permit a user to access the terminal dependent on results of the performed second operation mode.

22. An apparatus, comprising:
one or more processors configured to:
perform a first operation mode which includes a face detection with respect to a current frame;
perform another operation mode which includes the face detection and at least one of facial recognition and unauthorized object detection with respect to the current frame, where the first operation mode is performed without performing the facial recognition and without performing the unauthorized object detection;
determine between a locked state and an unlocked state of a terminal for the current frame;
when a result of the determination between the locked state and the unlocked state of the terminal is that the terminal is in the unlocked state, perform one operation mode selected between the first operation mode and the other operation mode for determining whether recognition of a user succeeds for the current frame; and
when a result of the determination between the locked state and the unlocked state of the terminal is that the terminal is in the locked state dependent on a previous frame, determine one or more reasons why the terminal is in the locked state dependent on the previous frame and selectively maintain the terminal in the locked state dependent on the determined one or more reasons, for the determining of whether the recognition succeeds for the current frame.

* * * * *